(12) United States Patent
Yu et al.

(10) Patent No.: US 11,321,066 B2
(45) Date of Patent: May 3, 2022

(54) SECURING SOFTWARE INSTALLATION THROUGH DEEP GRAPH LEARNING

(71) Applicant: NEC Laboratories America, Inc., Princeton, NJ (US)

(72) Inventors: Xiao Yu, Princeton, NJ (US); Xueyuan Han, Allston, MA (US); Ding Li, Franklin Park, NJ (US); Junghwan Rhee, Princeton, NJ (US); Haifeng Chen, West Windsor, NJ (US)

(73) Assignee: NEC Corporation

( * ) Notice: Subject to any disclaimer, the term of this patent is extended or adjusted under 35 U.S.C. 154(b) by 98 days.

(21) Appl. No.: 16/985,647

(22) Filed: Aug. 5, 2020

(65) Prior Publication Data

US 2021/0048994 A1 Feb. 18, 2021

Related U.S. Application Data

(60) Provisional application No. 62/885,429, filed on Aug. 12, 2019.

(51) Int. Cl.
*G06F 8/61* (2018.01)
*G06F 16/901* (2019.01)
*G06N 3/04* (2006.01)

(52) U.S. Cl.
CPC ............ *G06F 8/61* (2013.01); *G06F 16/9024* (2019.01); *G06N 3/0454* (2013.01)

(58) Field of Classification Search
CPC ...... G06F 8/61; G06F 16/9024; G06N 3/0454
USPC ......................................................... 717/174
See application file for complete search history.

(56) References Cited

PUBLICATIONS

Kruegel et al, "Static disassembly of obfuscated binaries", In USENIX security Symposium, vol. 13. pp. 18-18, Aug. 2004.
Kirat et al., "Barecloud: baremetal analysis-based evasive malware detection", In 23rd USENIX Security Symposium (USENIX Security 14). pp. 287-301, Aug. 2014.
Kapravelos et al., "Revolver: An automated approach to the detection of evasive web-based malware", In Presented as part of the 22nd USENIX Security Symposium (USENIX Security 13). pp. 637-652, Aug. 2013.
Caballero et al., "Measuring pay-per-install: the commoditization of malware distribution", In Usenix security symposium. pp. 13-13, Aug. 2011.

(Continued)

*Primary Examiner* — Jae U Jeon
*Assistant Examiner* — Bradford F Wheaton
(74) *Attorney, Agent, or Firm* — Joseph Kolodka

(57) ABSTRACT

A computer-implemented method for securing software installation through deep graph learning includes extracting a new software installation graph (SIG) corresponding to a new software installation based on installation data associated with the new software installation, using at least two node embedding models to generate a first vector representation by embedding the nodes of the new SIG and inferring any embeddings for out-of-vocabulary (OOV) words corresponding to unseen pathnames, utilizing a deep graph autoencoder to reconstruct nodes of the new SIG from latent vector representations encoded by the graph LSTM, wherein reconstruction losses resulting from a difference of a second vector representation generated by the deep graph autoencoder and the first vector representation represent anomaly scores for each node, and performing anomaly detection by comparing an overall anomaly score of the anomaly scores to a threshold of normal software installation.

17 Claims, 7 Drawing Sheets

(56) References Cited

PUBLICATIONS

Li et al., "Finding the linchpins of the dark web: a study on topologically dedicated hosts on malicious web infrastructures", In 2013 IEEE Symposium on Security and Privacy. IEEE, pp. 112-126, May 2013.

Stokes et al., "Webcop: Locating neighborhoods of malware on the web", Usenix Workshop on Large-Scale Exploits and Emerging Threats (LEET), pp. 1-8, Apr. 2010.

Xu et al., "Autoprobe: Towards automatic active malicious server probing using dynamic binary analysis", In Proceedings of the 2014 ACM SIGSAC Conference on Computer and Communications Security. ACM, pp. 179-190, Nov. 2014.

Kwon et al., "The dropper effect: Insights into malware distribution with downloader graph analytics", In Proceedings of the 22nd ACM SIGSAC Conference on Computer and Communications Security. ACM, pp. 1118-1129, Oct. 2015.

Rahbarinia et al., "Real-time detection of malware downloads via large-scale URL-> file-> machine graph mining", In Proceedings of the 11th ACM on Asia Conference on Computer and Communications Security. ACM, pp. 783-794, May 2016.

Stringhini et al., "Marmite: spreading malicious file reputation through download graphs", In Proceedings of the 33rd Annual Computer Security Applications Conference. ACM, pp. 91-102, Dec. 2017.

Cylance, I Kill You! (2019). https://skylightcyber.com/2019/07/18/cylance-i-kill-you/., Jul. 2019.

Milajerdi et al., "HOLMES: real-time APT detection through correlation of suspicious information flows.", In 2019 IEEE Explore Symposium on Security and Privacy. IEEE, pp. 1137-1152, May 2019.

Hossain et al., "SLEUTH: Real-time attack scenario reconstruction from COTS audit data", In 26th USENIX Security Symposium (USENIX Security 17), pp. 487-504, Vancouver, BC, 2017. USENIX Association, Aug. 2017.

Hassan et al., "NoDoze: Combatting Threat Alert Fatigue with Automated Provenance Triage.", pp. 1-15, NDSS Symposium, Feb. 2019.

Liu et al., "Towards a Timely Causality Analysis for Enterprise Security.", pp. 1-15, NDSS Symposium, Feb. 2018.

Wang et al., "Deep Program Reidentification: A Graph Neural Network Solution.", in SIAM International Conference on Data Mining (SDM'19), University of Illinois at Chicago, pp. 1-35, Dec. 2018.

Anderson et al., "Graph-based malware detection using dynamic analysis", J Comput Virol (2011) 7:247-258, Jun. 2011, pp. 247-258.

Barabosch et al., "Bee Master: Detecting Host-Based Code Injection Attacks", DIMVA 2014, Jul. 2014, pp. 1-20.

Barabosch et al., "Quincy: Detecting Host-Based Code Injection Attacks in Memory Dumps", DIMVA 2017, Jul. 2017, pp. 209-229.

Dong et al., "Efficient Discovery of Abnormal Event Sequences in Enterprise Security Systems", CIKM'17, Session 3F: Temporal Data, Nov. 2017, pp. 707-715.

Hardy et al., "DL4MD: A Deep Learning Framework for Intelligent Malware Detection", 2016 Int'l Conf. Data Mining, Dec. 2016, pp. 61-67.

Kolosnjaji et al., "Deep Learning for Classification of Malware System Call Sequences", AI 2016, LNAI 9992, Dec. 2016, pp. 137-149.

Korczynski et al., Capturing Malware Propagations with Code Injections and Code-Reuse Attacks, CCS'17, Session H2: Code Reuse Attacks, Oct. 2017, pp. 1691-1708.

Pek et al., "Membrane: A Posteriori Detection of Malicious Code Loading by Memory Paging Analysis", ESORICS 2016, Sep. 2016, pp. 199-216.

Shu et al., "Unearthing Stealthy Program Attacks Buried in Extremely Long Execution Paths", CCS'15, Oct. 2015, 13 pages.

Siddiqui et al., "Detecting Cyberattack Entities from Audit Data via Multi-View Anomaly Detection with Feedback", The Workshops of the Thirty-Second AAAI Conference on Artificial Intelligence, Feb. 2018, pp. 227-284.

Caselli et al., "Sequence-aware Intrusion Detection in Industrial Control Systems", CPSS'15, Apr. 2015, pp. 13-24.

Chen et al., "Entity Embedding-Based Anomaly Detection for Heterogeneous Categorical Events", Proceedings of the Twenty-Fifth International Joint Conference on Artificial Intelligence (IJCAI-16), Jul. 2016, pp. 1396-1403.

700

Extract at least one training software installation graph (SIG) based on training data to obtain a complete set of graphs, the at least one training SIG having nodes representing system subjects and objects and edges recording interactions between the system subjects and objects
710

Divide the complete set of graphs into a training set and a validation set
720

Learn node embedding models from the training set using random walks and pathname components, including randomly sampling individual paths to a configurable length from the at least one training SIG to generate training data including the individual paths
730

Train a deep graph autoencoder to reconstruct normal process nodes and minimize reconstruction losses between an encoder and a decoder
740

Use validation data of the validation set to verify model performance and determine a threshold of normal software installation using the reconstruction losses
750

Extract a new software installation graph (SIG) corresponding to a new software installation based on installation data associated with the new software installation, the new SIG having nodes representing system subjects and objects and edges recording interactions between the system subjects and objects
810

Use at least two node embedding models to generate a first vector representation by embedding the nodes of the new SIG and inferring any embeddings for out-of-vocabulary (OOV) words corresponding to unseen pathnames
820

Utilize a deep graph autoencoder including a graph long short-term memory (LSTM) as an encoder and a multilayer perceptron (MLP) as a decoder to reconstruct nodes of the new SIG from latent vector representations encoded by the graph LSTM, wherein reconstruction losses resulting from a difference of a second vector representation generated by the deep autoencoder and the first vector representation represent anomaly scores for each node
830

Perform anomaly detection by comparing an overall anomaly score of the anomaly scores to a threshold of normal software installation
840

FIG. 8

SECURING SOFTWARE INSTALLATION THROUGH DEEP GRAPH LEARNING

RELATED APPLICATION INFORMATION

This application claims priority to provisional application Ser. No. 62/885,429, filed on Aug. 12, 2019, incorporated herein by reference herein in its entirety.

BACKGROUND

Technical Field

The present invention relates to computer security, and more particularly to securing software installation through deep graph learning.

Description of the Related Art

Software installation can be risky as an attractive initial access point for malicious software ("malware") because installer programs often execute with elevated administrative privileges that can enable malware to embed itself into computer systems with relative ease and provide attackers with capabilities to immediately corrupt a system or establish longer-term persistent threats. Signed installation packages may verify package origin (not semantic integrity), meaning that installer programs can be corrupted before being signed. Complex and diverse installation behavior can mask stealthy, malicious background activity, while few defenses are in place to secure software installation. Such software installation attacks can be particularly devastating for large enterprises given their valuable information assets and conspicuous, multitudinous points-of-attack (e.g., large networks accessed by staff with various levels of cyber hygiene). Accordingly, detection techniques may be inadequate in providing effective end-point protection against compromised software installations because these attacks may hide behind software vendors that are often trusted by users.

SUMMARY

According to an aspect of the present invention, a method for securing software installation through deep graph learning is provided. The method includes extracting a new software installation graph (SIG) corresponding to a new software installation based on installation data associated with the new software installation. The new SIG has nodes representing system subjects and objects and edges recording interactions between the system subjects and objects. The method further includes using at least two node embedding models to generate a first vector representation by embedding the nodes of the new SIG and inferring any embeddings for out-of-vocabulary (OOV) words corresponding to unseen pathnames, and utilizing a deep graph autoencoder including a graph long short-term memory (LSTM) as an encoder and a multilayer perceptron (MLP) as a decoder to reconstruct nodes of the new SIG from latent vector representations encoded by the graph LSTM. Reconstruction losses resulting from a difference of a second vector representation generated by the deep graph autoencoder and the first vector representation represent anomaly scores for each node. The method further includes performing anomaly detection by comparing an overall anomaly score of the anomaly scores to a threshold of normal software installation.

According to another aspect of the present invention, a system for securing software installation through deep graph learning is provided. The system includes a memory device storing program code and at least one processor device operatively coupled to the memory device. The at least one processor device is configured to execute program code stored on the memory device to extract a new software installation graph (SIG) corresponding to a new software installation based on installation data associated with the new software installation. The new SIG has nodes representing system subjects and objects and edges recording interactions between the system subjects and objects. The at least one processor device is further configured to execute program code stored on the memory device to use at least two node embedding models to generate a first vector representation by embedding the nodes of the new SIG and inferring any embeddings for out-of-vocabulary (OOV) words corresponding to unseen pathnames, and utilize a deep graph autoencoder including a graph long short-term memory (LSTM) as an encoder and a multilayer perceptron (MLP) as a decoder to reconstruct nodes of the new SIG from latent vector representations encoded by the graph LSTM. Reconstruction losses resulting from a difference of a second vector representation generated by the deep graph autoencoder and the first vector representation represent anomaly scores for each node. The at least one processor device is further configured to execute program code stored on the memory device to perform anomaly detection by comparing an overall anomaly score of the anomaly scores to a threshold of normal software installation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 7 is a block/flow diagram illustrating a system/method for utilizing a model training and validation process used to secure software installations, in accordance with an embodiment of the present invention;

FIG. 8 is a block/flow diagram illustrating a system/method for securing software installation through deep graph learning, in accordance with an embodiment of the present invention.

DETAILED DESCRIPTION OF PREFERRED EMBODIMENTS

Figure 1:
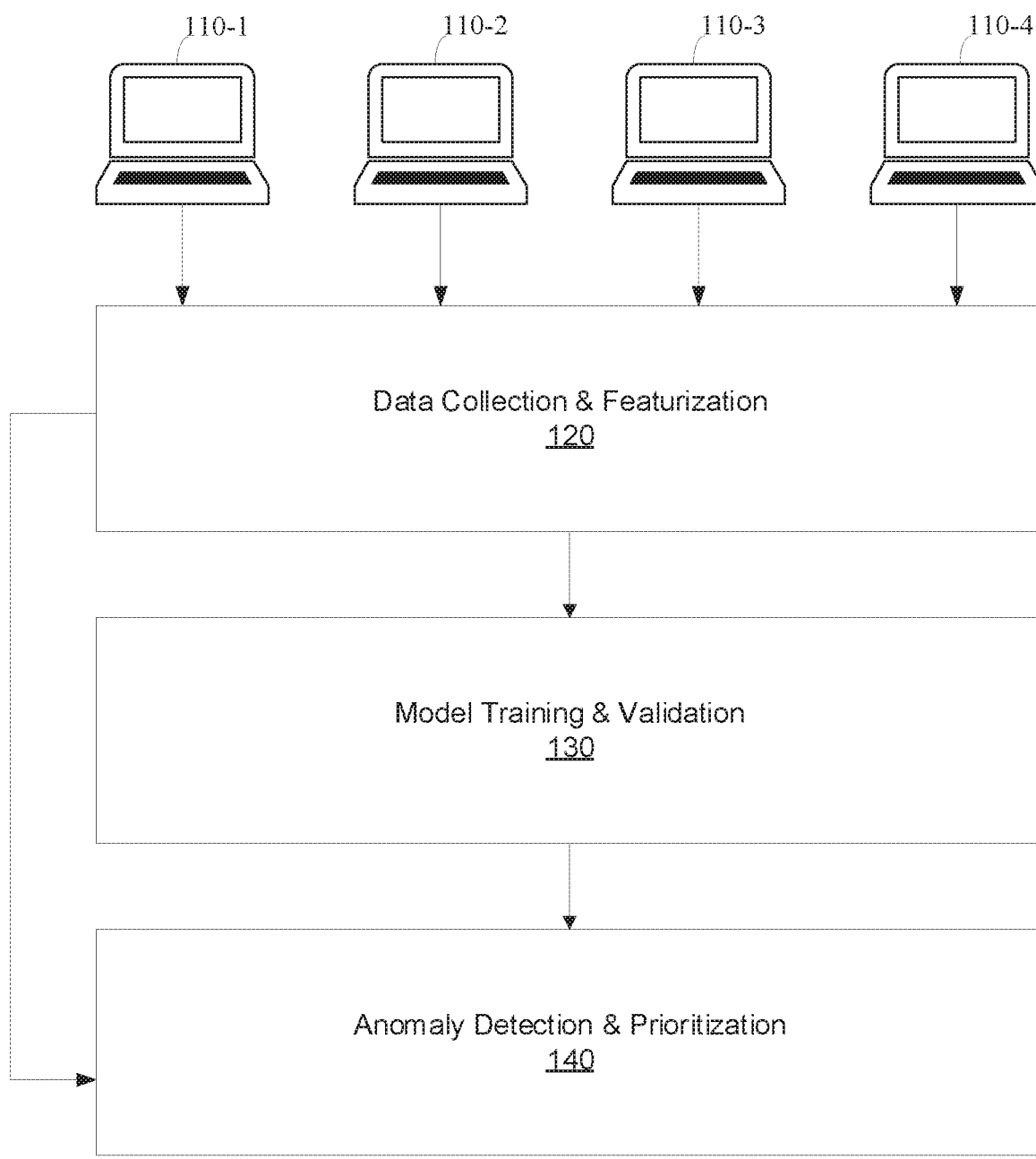
FIG. 1 is a diagram illustrating an exemplary computing environment configured to implement secure software installation, in accordance with an embodiment of the present invention.

In accordance with embodiments of the present invention, systems and methods are provided for securing software installation by detecting anomalous or malicious installation behavior using deep graph learning. The embodiments described herein can learn end-point system behavior to detect malicious activity during software installation and estimate the legitimacy of the installation processes by leveraging complex and rich information in various system objects and behaviors, and their relations. Accordingly, the embodiments described herein can improve the ability to detect malicious software installations and identifying malicious processes.

More specifically, a software installation graph (SIG) can be built based on collected traces of system (call) activity. The SIG is a data provenance graph describing a historical chain of events that results in software installation by encoding system subjects (e.g., processes) that manipulate their objects (e.g., files and socket connections), thus including complex relationships beyond those between only downloader and payload files. It is noted that once a malicious installation begins, a machine can exhibit anomalous behavior. Thus, the SIG can include short-term (but high-fidelity) provenance information needed to capture malicious installation activity. The provenance data of the SIG can be analyzed using an autoencoder architecture to automatically detect anomalies using unsupervised deep learning, which means that human analysts need not manually label training sets with benign and malicious graphs. Instead, given a machine which is known to be malware-free, the embodiments described herein can automatically "featurize" the SIG using a component-based embedding technique tailored for system graphs, and then apply long short-term memory (LSTM) networks to extract features of the SIG corresponding to normal behavior. Since these features do not rely on any particular malware, they are general and robust against malicious behavior. When deployed on an "in-the-wild" machine, the embodiments described herein can use anomaly scores to calculate how far the machine deviates from the baseline features (and thus how likely it is that a machine is experiencing a malicious installation). Attack attribution can be assisted by ranking nodes in the SIG based on anomaly scores, thereby allowing system administrators to prioritize the investigation of the most suspicious process behavior(s).

The embodiments described herein can pinpoint the processes most likely to have triggered malicious behavior, work on different audit platforms and operating systems, and can be robust to training data contamination and adversarial attack. The embodiments described herein can be used with application-specific models, even in the presence of new software versions, as well as application-agnostic meta-models that encompass a wide range of applications and installers.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Referring now in detail to the figures in which like numerals represent the same or similar elements and initially to FIG. 1, a high-level diagram is provided illustrating a software installation malware detection framework 100. The framework 100 formalizes the software installation malware detection problem as a graph-based outlier detection problem. It is assumed that software installation begins when installer execution begins (e.g., when a user double-clicks on a downloaded package) and terminates when the installer process and all its descendants exit. That is, the attacker's attempt to infiltrate the network through malicious software installation is assumed to be the initial system breach. The attacker may distribute malicious installers using phishing e-mails, through legitimate software distribution channels (e.g., by comprising the integrity of such channels or acting as a man-in-the-middle), or by direct access to the network (e.g., an insider attack). The installation behavior of a software package can be characterized as a chain of system events leading to its binary files being written to a host system.

As shown, a plurality of computing devices, including computing devices 110-1 through 110-4, send audit data to data collection and featurization component 120. For example, the plurality of computing devices can include enterprise workstations.

The component 120 is configured transform each audit log into a graphical representation referred to herein as a software installation graph (SIG), which is defined to represent the event chain. For example, the at least one SIG can be built using at least one suitable logging framework based on at least one suitable provenance model.

A SIG in accordance with the embodiments described herein can define of three types of nodes: (1) process nodes representing running processes on the system under monitoring; (2) file nodes representing files being manipulated by processes; and (3) network nodes representing remote endpoints which processes read from or write to. The SIG can also define the following types of edges between nodes: (1) a process reading/writing/loading/renaming a file; (2) a process starting/terminating a process; (3) a process reading/writing a remote network endpoint; and (4) a process changing its internal state by reading/loading from a file or a remote network endpoint.

More specifically, a SIG can be mathematically represented as an attributed directed acyclic graph (DAG) G=(V, E), where the nodes V, represent system subjects (e.g., processes) and objects (e.g., files and sockets), and the edges E record interactions between the system subjects and objects. In one embodiment, the at least one SIG can be produced by backtracking from installed software executable(s), represented a file node(s). Further details regarding SIG construction and backtracking will be described below with reference to FIGS. 2, 3 and 6.

Then, the component 120 is further configured to divide the complete set of graphs ($G_C$) into a training set ($G_T$) and a validation set ($G_V$). In one embodiment, about 80% of the graphs are in $G_T$ and about 20% of the graphs are in $G_V$. Thus, a graph G represents a benign software installation graph for a particular installation. Node embedding models can then be learned from $G_T$. Further details regarding node embedding will be described below with reference to FIG. 2.

Given the features learned using the component 120, a model training & validation component 130 is configured to train a deep graph learning model M of the installation behavior. In one embodiment, the deep graph learning model is a deep graph autoencoder using a graph long short-term memory (LSTM) as its encoder and a multilayer perceptron (MLP) as its decoder. A graph LSTM allows for flexible graph structures (e.g. DAGs) and consider distinct edge types. Similar to other LSTMs, a graph LSTM unit j can include input and output gates $i_j$ and $o_j$, a memory cell $c_j$ and a hidden state $h_j$. A graph LSTM unit might have multiple child units C(j). For each child unit k, there is a forget gate $f_{jk}$ and a type-specific weight matrix $U^{e_{jk}}$, where $e_{jk}$ denotes the edge type that connects j and k. Given the input vector for unit j, the transition equations can be provided as follows:

$$i_j = \sigma\left(W_i x_j + \sum_{k \in C(j)} U_i^{e_{jk}} h_k + b_i\right)$$

$$o_j = \sigma\left(W_o x_j + \sum_{k \in C(j)} U_o^{e_{jk}} h_k + b_o\right)$$

$$\tilde{c}_j = \tanh\left(W_c x_j + \sum_{k \in C(j)} U_c^{e_{jk}} h_k + b_c\right)$$

$$f_{jk} = \sigma\left(W_f x_j + U_f^{e_{jk}} h_k + b_f\right)$$

$$c_j = i_j \odot \tilde{c}_j + \sum_{k \in C(j)} f_{jk} \odot c_k$$

$$h_j = o_j \odot \tanh c_j$$

where $x_j$ is the input feature vector, each W is an input weight matrix, each b is a bias vector, σ is the sigmoid function, tan h(•) is the hyperbolic tangent function, and ⊙ is the Hadamard product (element-wise multiplication).

The deep graph autoencoder models process nodes as a function of those nodes that came before them (temporally) in the SIG. The intuition underlying the deep graph autoencoder is that anomalous nodes are inherently difficult to be represented accurately in the embedding space, so trying to reconstruct the anomalous nodes produces much larger reconstruction losses or errors. Generally, a reconstruction loss for a given original input is the difference between the given original input and its reconstructions. For example, a reconstruction loss can be defined as the normalized difference of the vector representation generated by the deep graph model and the vector representation generated by the node embedding model. The deep graph autoencoder address the limitations of binary classification through unsupervised one-class learning based on normal SIGs. It jointly trains the graph LSTM (encoder) with the MLP (decoder).

More specifically, given a number of benign installations $I=\{G^{(s1)}, G^{(s2)}, \ldots, G^{(sj)}\}$ on endpoint systems $s_1, s_2, \ldots s_j$, the model M can classify a new installation graph $G^{(sk)}$, $k \notin \{1, 2, \ldots, j\}$ as benign or malicious. The deep graph autoencoder learns to reconstruct normal process nodes in $G \in G_T$ from their latent representations encoded by the graph LSTM, thereby minimizing reconstruction losses or errors. The component 130 then uses $G_V$ to verify the performance of the learned model M and, using the reconstruction losses, can be used to determine a threshold of normal software installation. An exemplary autoencoder architecture will now be described in further detail below with reference to FIG. 6.

Figure 6:
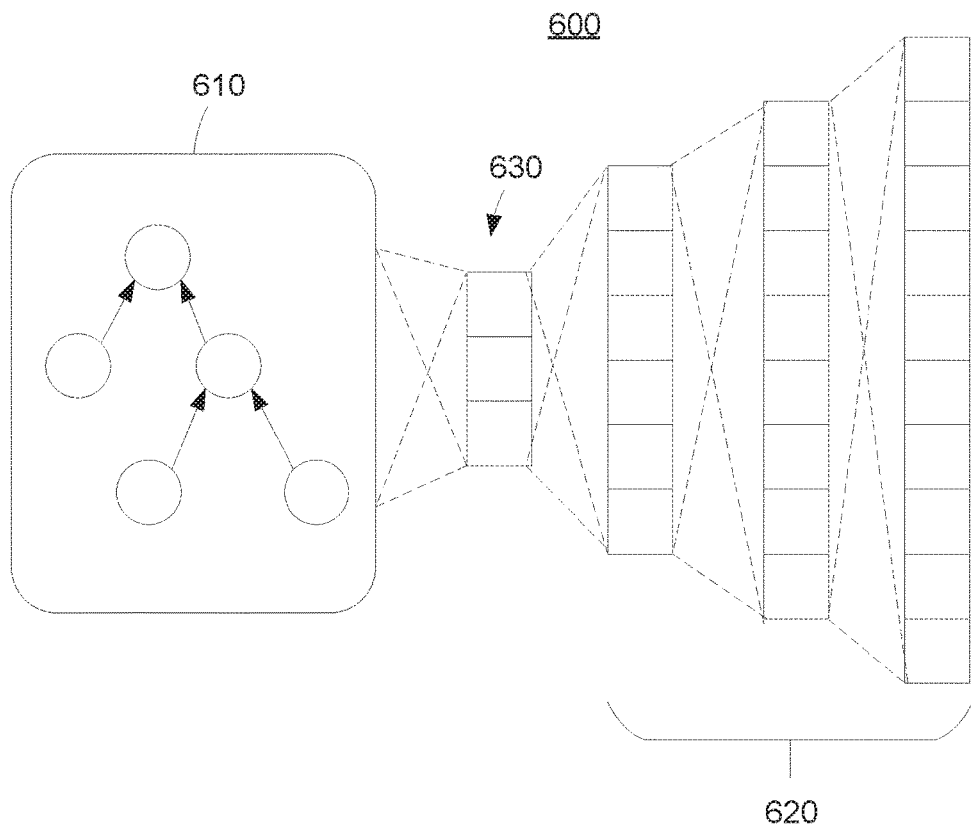
FIG. 6 is a block/flow diagram illustrating an exemplary deep graph autoencoder, in accordance with an embodiment of the present invention.

With reference to FIG. 6, an illustrative autoencoder 600 is provided. As shown, the autoencoder 600 includes an encoder 610 and a decoder 620. More specifically, the encoder 610 includes a graph long short-term memory (LSTM) and the decoder 620 is a multilayer perceptron (MLP). The autoencoder 600 learns to reconstruct process nodes. Nodes that show significant topological difference from those encountered during training correspond to unexpected changes in installation behavior, which signals malware activity and can lead to large reconstruction losses or errors.

The encoder 610 learns a hidden representation 630 of each process node through the graph LSTM, taking into account the node's attributes (e.g., feature embedding) and the hidden representation of all its source nodes (e.g., temporality) distinguished by connection types (e.g., heterogeneity). The decoder 620 learns to reconstruct the original node embedding from the hidden representation 630. The objective in accordance with the embodiments described herein is to minimize the reconstruction loss in the training dataset $G_T$ (as described above with reference to FIG. 1), which includes normal SIGs (unsupervised learning).

Referring back to FIG. 1, an anomaly detection & prioritization component 140 is configured to detect anomalous test graphs and rank nodes within the graph based on their anomaly scores. For example, for a new software installation, the component 140 can take audit logs from the new software installation, generate a corresponding new SIG, embed the nodes of the new SIG using the trained node embedding models, and use the model M to reconstruct all the process nodes. The resulting reconstruction losses are the anomaly scores for each node. Accordingly, the component 140 implements a deviation-based anomaly detection system in that it treats process nodes with high reconstruction loss as anomalies.

More specifically, a threshold of normal software installation can be determined from the reconstruction losses observed during validation and, if the overall anomaly scores exceeds the threshold, the installation can be classified as abnormal. Given an abnormal graph $G_A$, the model M can be used to rank process nodes $V_P \subset V$ to identify which processes exhibit the most anomalous behavior. The component 140 can report a list, sorted by anomaly scores, of the most suspicious processes of the abnormal installation. Accordingly, system administrators can analyze process behavior through the new SIG, prioritizing the ones with the highest anomaly scores.

A small number of process nodes (e.g. those with a large number of descendants) can be inherently much more difficult to reconstruct than other ones of the process nodes by having orders of magnitude higher reconstruction losses. If the losses are arranged in descending order, "natural breaks" that partition the process nodes into ranges can be observed, which separate reconstruction losses of the process nodes into multiple "zones." The losses in the first range, which have the largest values, represent the limits of representational capability, thus providing a baseline to determine the threshold of normal software installation. Any suitable statistical mapping method can be used to systematically discover class intervals of the natural breaks in the data series, or reconstruction losses.

The validation set $G_V$ can be used to calculate the normality threshold. For example, a list of largest average losses from the validation set can be appended to a threshold list. The largest average losses from the validation set can be determined by obtaining node losses of each validation graph of the validation set using the autoencoder, identifying the zone with the largest average loss for each validation graph, and constructing the list that contains those average losses for all the validation graphs. Then, the normality threshold can be determined based on the list. Illustratively, the normally threshold can be based on the mean and standard deviation of the list. For example, the normality threshold can be defined as the mean of the values in the list plus three-times the standard deviation of the values of the list. However, the normality threshold can be adjusted according to needs (e.g., to optimize towards a low false positive/negative rate).

Given the normality threshold, the component 140 can consider any SIG exceeding this threshold to be abnormal. The component 140 can provide system administrators with a list of process nodes of an abnormal SIG, which can be sorted or ranked by anomaly scores.

Further details regarding FIG. 1 will be described below with reference to FIGS. 2-6.

Figure 2:
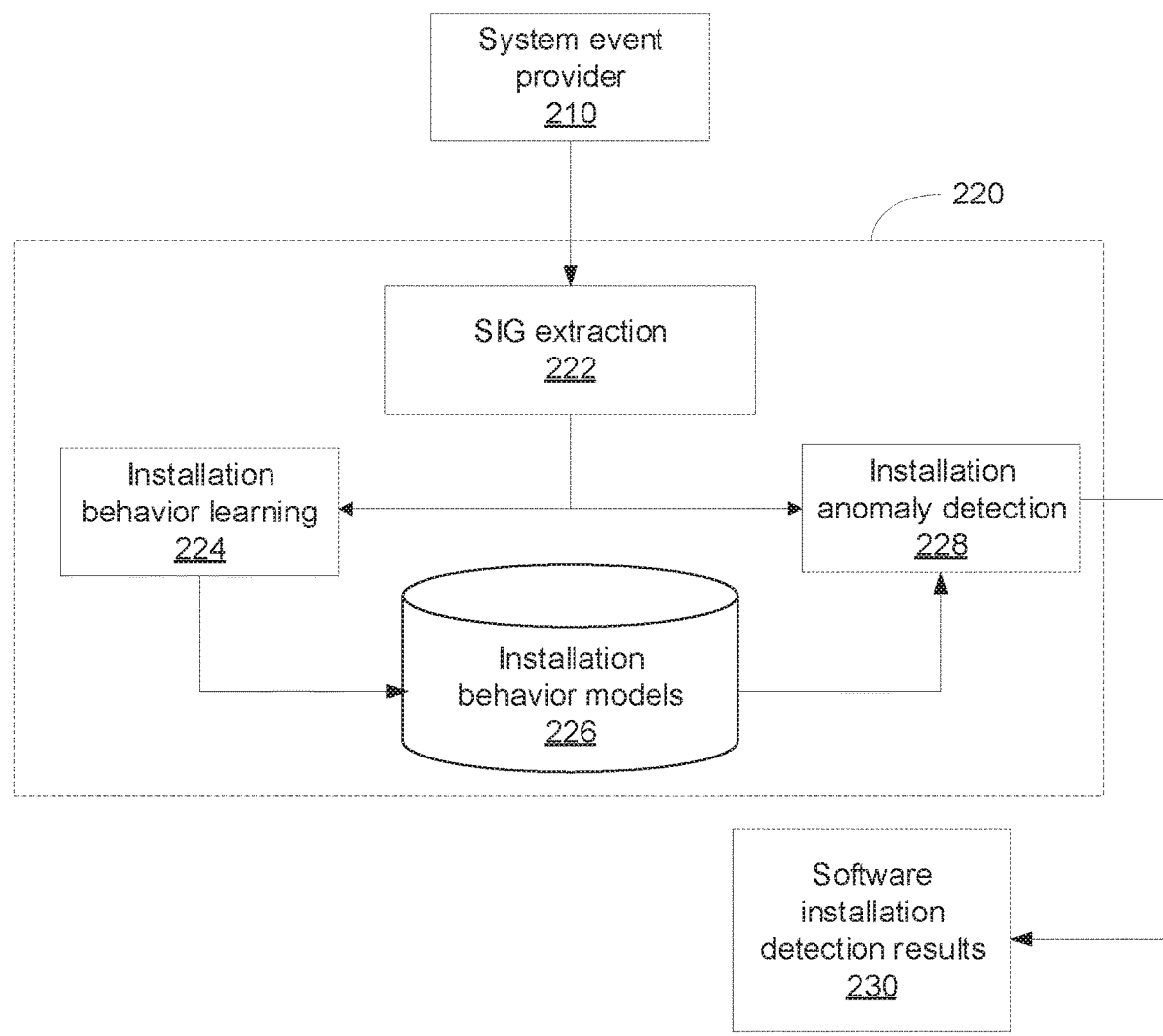
FIG. 2 is a block/flow diagram illustrating a high-level system/method for securing software installation, in accordance with an embodiment of the present invention.

Referring now to FIG. 2, a high-level system/method 200 for securing software installation is illustratively depicted in accordance with one embodiment of the present invention. The system/method 200 can be illustratively implemented within the framework described above with reference to FIG. 1.

As shown, the system/method 200 includes a system event provider component 210 and a software installation learning and detection component 220.

The component 210 is configured to provide system events ("events") as input to the component 220 for consumption. The component 210 can be implemented by any suitable system configured to provide events containing suitable information or data to describe the running state of a computer system under monitoring in accordance with the embodiments described herein. For example, the information or data can include, e.g.: (1) a process starting/terminating another process; (2) a process reading/writing/renaming/loading another file; (3) a process reading from/writing to a network connection; and (4) a timestamp for each event so events can be ordered.

As shown in this illustrative embodiment, the component 220 includes a software installation graph (SIG) extraction subcomponent 222 configured to extract at least one SIG from a sequence of events received from the component 210. More specifically, the subcomponent 222 can be configured to run a backtracking process tailored for software installation behaviors to extract at least one SIG from the sequence of events. In one embodiment, the sequence of events can be ordered (e.g., in ascending or descending order) by their timestamps. Further details regarding the subcomponent 222 will be now be described in further detail below with reference to FIG. 3.

Figure 3:
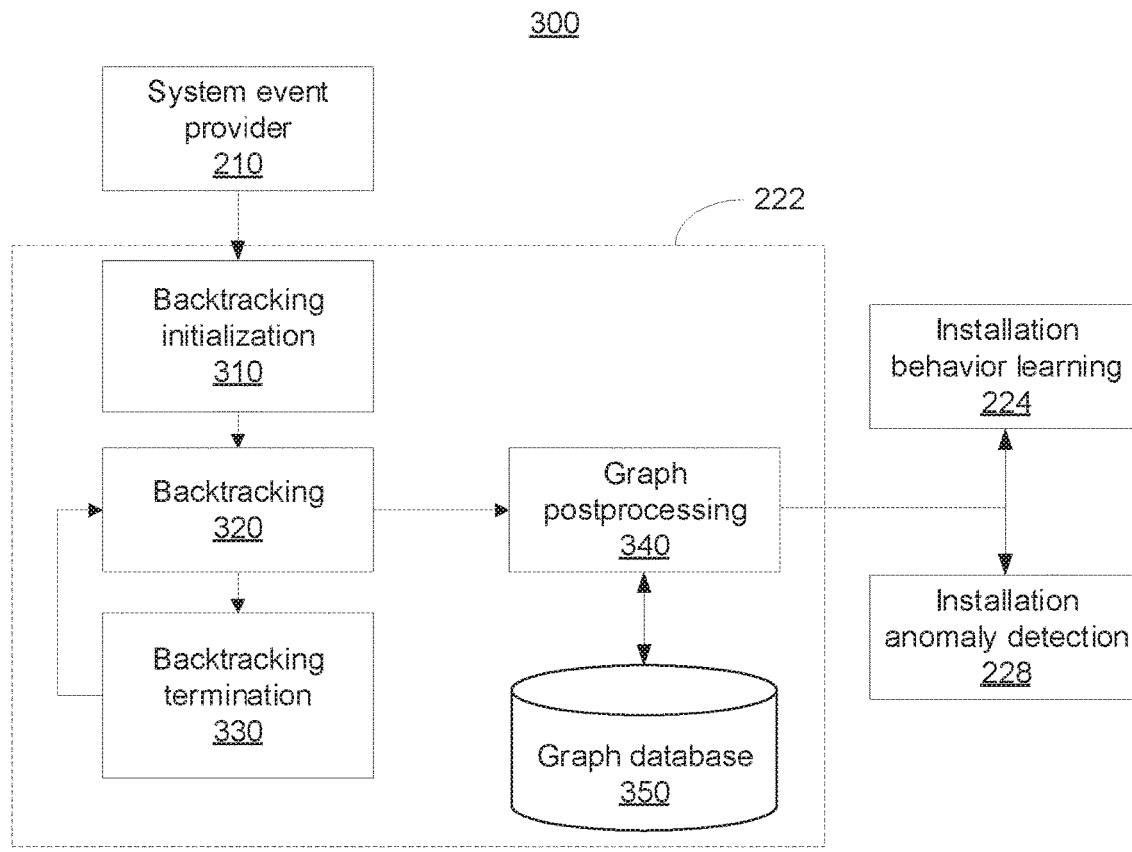
FIG. 3 is a block/flow diagram illustrating a software installation graph extraction subcomponent of the software installation learning and detection component of FIG. 2, in accordance with an embodiment of the present invention.

Referring now to FIG. 3, a system/method 300 is provided depicting the operation of an exemplary software installation graph (SIG) extraction subcomponent. The system/method 300 can include the system event provider 210 of FIG. 2, the SIG extraction subcomponent 222 of FIG. 2, the installation behavior learning subcomponent 224 of FIG. 2, and the installation anomaly detection subcomponent 228 of FIG. 2.

As shown, the SIG extraction subcomponent 222 includes a backtracking initialization subcomponent 310 configured to receive events from the system event provider component 210, and identify a starting point of backtracking by finding events of a process writing a binary file or renaming a file into a binary file. Domain-knowledge-based heuristics on file name suffix can be used to determine if a file is a binary file.

The SIG extraction subcomponent 222 further includes a backtracking subcomponent 320 configured to backtrack through all past events to find relevant events iteratively, and construct at least one preprocessed SIG by converting and mapping each event into a component of the SIG (e.g., node and/or edge). The at least one preprocessed SIG can describe at least a partial software installation instance.

More specifically, given a file node, backtracking can include adding edges having the file node as their destination. This procedure can then be recursively repeated for each newly added node, backtracking to the download of the installation package. The resulting SIG includes all processes involved in the installation, as well as, e.g., any dynamically linked libraries (DLL) that were executed. An adjustable time can be applied based on how far back generic system services (represented as process nodes) that are commonly invoked during software installation are tracked, thereby minimizing dependency explosion. If the installation produced more than one installed executable, the backtraces can be combined into a single SIG. A SIG can be produces by generating multiple node versions as the state of the corresponding subject/object changes.

The SIG extraction subcomponent 222 further includes a backtracking termination subcomponent 330 configured to, during the backtracking performed by the backtracking subcomponent 320, use a set of stop criteria to determine if the backtracking should stop. The set of stop criteria can include, e.g., that there are no other relevant events and/or system processes that are known as not being installers. If the backtracking termination subcomponent 330 determines that backtracking should continue, the backtracking performed by the backtracking subcomponent 320 continues and the backtracking termination subcomponent 330 continues the termination monitoring.

Otherwise, once the backtracking terminates, the backtracking subcomponent 320 outputs the at least one preprocessed SIG to a graph postprocessing subcomponent 340. The graph postprocessing subcomponent 340 is configured to store the at least one preprocessed SIG in a graph database 350, and merge all relevant graphs that share common nodes stored in the graph database 350 to generate at least one merged graph corresponding to the at least one SIG. The at least one merged graph then becomes input to the installation behavior learning subcomponent 224 and/or the installation anomaly detection subcomponent 228. The at least one merged graph can capture a full picture of different stages of software installation if the installation involves multiple installer processes.

Referring back to FIG. 2, as further shown in this illustrative embodiment, the subcomponent 222 is configured to provide at least one SIG to an installation behavior learning subcomponent 224 and/or an installation anomaly detection subcomponent 228.

The subcomponent 224 is configured to run a model training process when the system is in a learning mode. More specifically, the subcomponent 224 is configured to design a malware detection model (e.g., unsupervised model) using an autoencoder architecture. The malware detection model captures complex, temporal, causal and structural relationships among processes, files, and network endpoints. For example, for the at least one SIG generated by the subcomponent 222, the subcomponent 224 can train a node embedding model and a deep graph model. An installation behavior models database 226 is configured to store all the learned models. Each stored model represents one or more kinds of software installations, labeled by the names of binary files they installed. Further details regarding the subcomponent 224 will now be described below with reference to FIG. 4.

Figure 4:
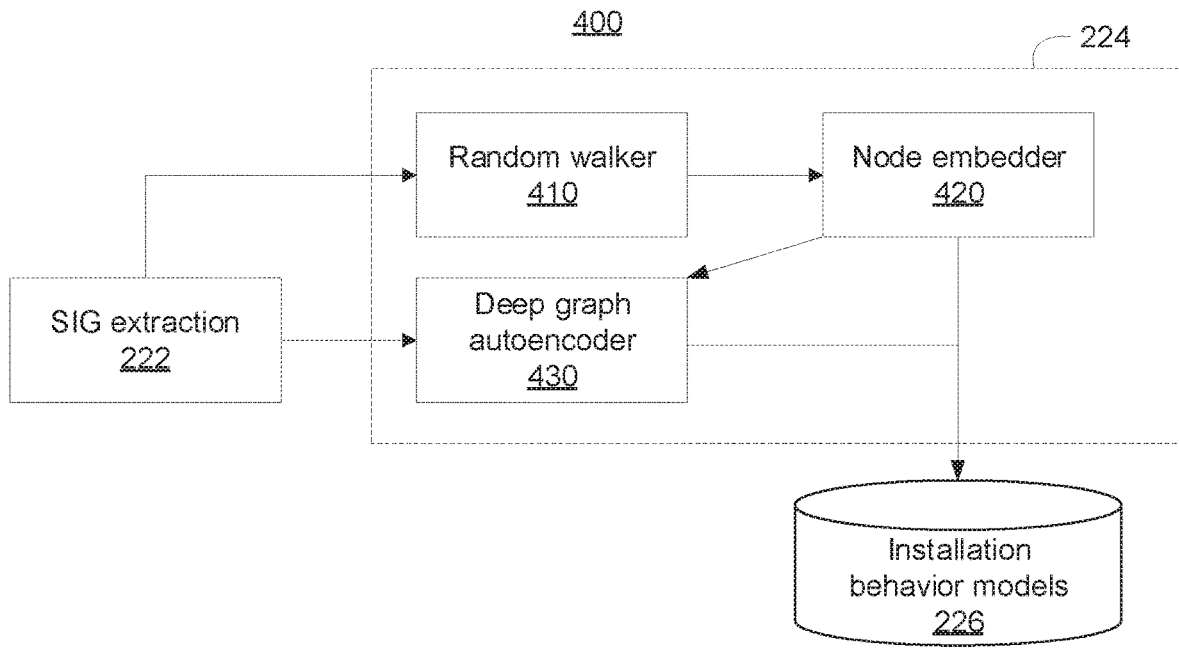
FIG. 4 is a block/flow diagram illustrating an installation behavior learning sub-component of the software installation learning and detection component of FIG. 2, in accordance with an embodiment of the present invention.

Referring now to FIG. 4, a system/method 400 is provided depicting the operation of an exemplary installation behavior learning subcomponent. The system/method 400 can include the software installation graph (SIG) extraction subcomponent 222, the installation behavior learning subcomponent 224, and the installation behavior models database 226 of FIG. 3.

As shown, the installation behavior learning subcomponent 224 includes a random walker 410, a node embedder 420 and a deep graph autoencoder 430.

The random walker 410 is configured to generate training data for the node embedder by randomly sampling individual paths to a configurable length from at least one SIG received from the SIG extraction subcomponent 222. More specifically, directed random walks of fixed length l can be performed to construct the causal context for each node. For example, given a source node $c_0$ in a given SIG, the given SIG can be traversed following the directions of the edges. If a node has more than one outgoing edge, one of the outgoing edges can be randomly picked to continue the walk. If $c_i$ denotes the i-th node of the walk, the causal context C for $c_0$ is $\{c_i | i=1, \ldots, l\}$, where $c_i$ is generated by the following distribution:

$$P(c_i = v \mid c_{i-1} = u) = \begin{cases} \frac{1}{N}, & \text{if } (u, v) \in E \\ 0, & 0 \text{ otherwise} \end{cases}$$

where N is the number of outgoing edges from $c_{i-1}$. Multiple causal contexts, or multiple walks, can be generated for each node.

Each node, whether file, process or socket, sampled by the random walker 410 corresponds to a file system pathname ("pathname"). Instead of considering each pathname as an atomic individual, the random walker 410 can further split a pathname by a pathname separator (e.g., "/") to divide it into sub-components (e.g., different levels of directory names in a pathname) to provide more context information to the following node embedder 420. This process enables the node embedder 420 to encode semantic relationships between pathnames (e.g., if two pathnames are similar), and generalize such relationships to unseen nodes in the training phase.

The node embedder 420 can generate a node embedding model based on the training data. More specifically, the node embedder 420 can generate vector-space embeddings for textual representations of system entities (processes, files, network sockets) with proximity of similar entities (e.g., two files in the same directory) in the embedding space to featurize the pathnames associated the nodes. The node embedder 420 thus learns how to convert the information in the at least one SIG, including processes, files, network endpoints, and their relations (e.g., read/write/start), into a vector space for the downstream training of the deep graph model. The embedding vectors generated by the deep graph model capture not only information contained within the textual representation of nodes and edges, but also context information around the embedded nodes. The node embedder 420 can generate meaningful vector representations for nodes that are unseen in the training graphs. Software installations can include such unseen nodes because a lot of installation processes create temporary files with random filenames.

In one embodiment, the node embedder 420 can generate the vector-space embeddings for the nodes in the at least one SIG using a Word2Vec-based approach. In the field of natural language processing, the Word2Vec technique is used to embed words into a low-dimensional continuous vector space, where words with similar context map closely together. Given a sequence of words, Word2Vec employs a skip-gram model that maximizes the log probability of predicting the context around a given target word to generate the embedding for that target word. A fixed size sliding window on the text sequence determines the context.

With this in mind, the textual representation of a node or an edge can be considered as a word or multiple words. To map semantically related nodes close in the embedding space, a component-based node embedding model can be used, where the embedding of each component of a path is learned and an additive method is used to embed a node as the normalize summation of its path components.

Since many installation processes create temporary files with random pathnames that may be unseen in the training phase, such new pathnames cause an out-of-vocabulary (OOV) problem known in the field of natural language processing. To solve this problem, the node embedder 420 uses a second embedding model based on the à la carte technique, which infers the embeddings for OOV words via a linear transformation of additive context embedding (e.g., the average embeddings of context words generated by the Word2Vec technique).

The deep graph autoencoder 430 learns related entities and how other related entities contribute to one target entity ("guess the target entity given all its precedent entities") using the node embedding instead of textual representations. More specifically, the deep graph autoencoder 430 includes an encoder and decoder configured to receive the at least one SIG from the SIG extraction subcomponent 222 and node embedding (vectorized node representations) generated by the node embedder 420, and vectorize each SIG by replacing all nodes and edges in each SIG with their vector representations based on the node embedding model. For example, the encoder of the deep graph autoencoder 430 can include a graph long short-term memory (LSTM) component and the decoder of the deep graph autoencoder 430 can include a multilayered perceptron (MLP) network.

More specifically, with vectorized graphs, the learning process can first perform an encoding process by feeding each SIG into the encoder (e.g., graph LSTM component) by the topological order of edges in the graph, and generating an output including a latent vector representation on each process node of each SIG based on all the previously consumed graph structures. Then, the learning process can transfer the output of the encoder (e.g., the latent vector representations generated on all of the process nodes of each SIG), to the decoder (e.g., the MLP network) which implements a decoding process to reconstruct the original vector representations of those process nodes. By minimizing reconstruction losses or errors between the encoding and decoding processes, the deep graph model can learn how to reconstruct the vector representation of each process node in the graph by all of its topological ancestors in the graph. This learning process can also automatically determine the threshold for anomaly detection based on the distribution of reconstruction losses of graph nodes during model training.

The vectorized node presentations generated by the node embedder 420 have properties that make the deep graph autoencoder 430 more effective, such as proximity of similar entities can enable the deep graph autoencoder 430 to generalize what it learns to new SIGs with similar but slightly different system entities. For example, some temporary files generated during installation may have different but similar enough filenames. As their embeddings would be proximate in the embedding space, the deep graph autoencoder 430 can easily pick up such similarity and regard such temporary files as equivalents.

Conceptually, the learned model can tell if some processes in an installation instance may be normal or not. For example, the learned model can output a vector representation for a given process of a SIG based on all its ancestor nodes and graph structure. If the ancestor nodes or the graph structure diverge greatly from what the model learns from the training data, the output representation of the given process can have a large distance from the real representation of the given process from the node embedding model. Such divergence is usually an indicator for malicious installation behaviors.

Referring back to FIG. 2, the subcomponent 228 is configured to receive at least one SIG generated by the subcomponent 222 and select at least one pair of models including a node embedding model and a deep graph model stored in the database 226 based on the installed files to run anomaly detection when the system is in detection mode. There may be multiple pairs of models selected due to overlaps in installed files. In such cases, the input SIG can be configured to run through each pair of the models.

With a pair of models, the subcomponent 228 is configured to embed graph nodes using the node embedding model (similar to preparation of the training data in the learning process) and use the deep graph model to reconstruct all process nodes. The resulting reconstruction losses or errors can be used to represent the anomaly scores for all the nodes. If the overall anomaly score exceeds a threshold (e.g., user-defined threshold), the installation is classified as abnormal and a list of the most suspicious processes ranked based on their anomaly scores is generated.

The subcomponent 228 is further configured to generate software installation detection results 230. The software installation detection results can include information describing: (1) at least one SIG that has been extracted; (2) whether the software installation is anomalous; and (3) if the software installation is anomalous, which process(es) may be most anomalous. System administrators can verify process behavior through the SIG, prioritizing the ones with the highest anomaly scores. Accordingly, the subcomponent 228 produces explainable detection output that prioritizes anomalous processes for inspection and can minimize mean time to know (MTTK), or the time it takes to prioritize problems and identify their root cause.

Figure 5:
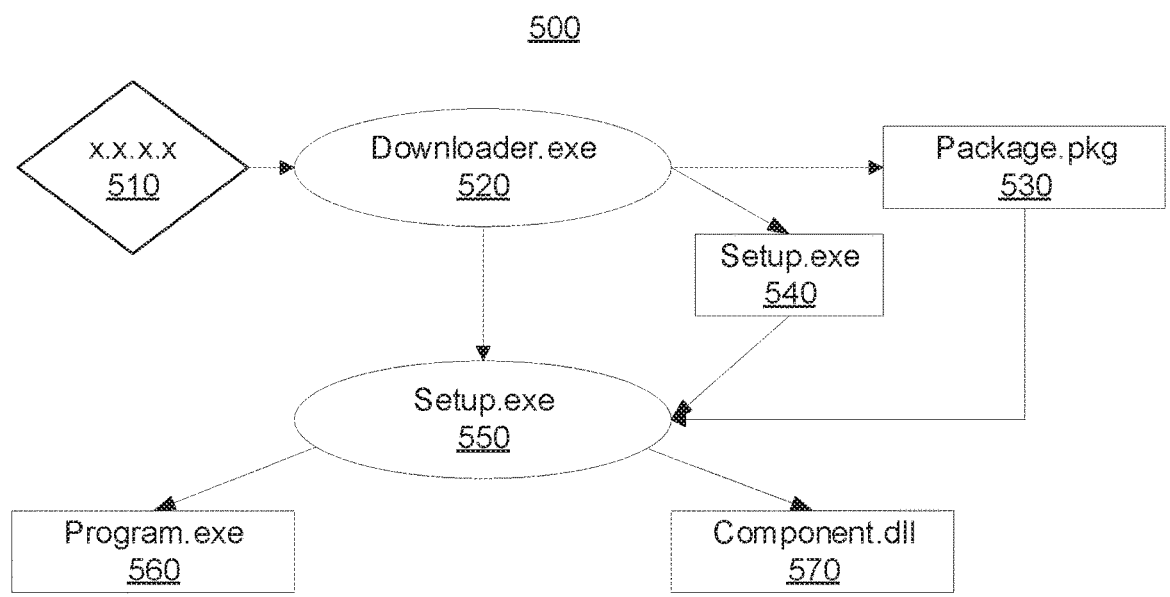
FIG. 5 is a diagram illustrating an example of a software installation graph (SIG), in accordance with an embodiment of the present invention.

Referring now to FIG. 5, a diagram is provided illustrating an exemplary software installation graph (SIG) 500 in accordance with the embodiments described herein.

The software installation behavior described by the SIG 500 involves at least one external network endpoint (illustratively denoted as "x.x.x.x") 510. The "x.x.x.x" indicates an address for the network endpoint from which a first installation process 520 ("Downloader.exe") reads data and writes to a first file 530 (illustratively denoted as "Package.pkg") and a second file 540 (illustratively denoted as "Setup.exe"). The first installation process 520 then starts a second installation process 550 (illustratively denoted as "Setup.exe"), which reads essential installation data from the first and second files 530 and 540 and then writes a first installed files 560 (illustratively denoted as "Program.exe") and a second installed file 570 (illustratively denoted as "Component.dll").

An example of paths from the SIG 500 that can be randomly sampled by a random walker (e.g., the random walker 410 of FIG. 4) could be "x.x.x.x read Downloader.exe write Package.pkg read Setup.exe write Component.dll." With potentially many such paths sampled from the graph, a node embedder (e.g., the node embedder 420 of FIG. 4) can generate a vector representation for each of the components in the example path. The node embedder can learn how to convert the information in the SIG 500, including processes, files, network endpoints, and their relations (e.g., read/write/start), As previously mentioned above with reference to FIG. 4, one aspect of the node embedder is that it can also generate meaningful vector representations for nodes that are unseen in the training graphs. Software installations can include such unseen nodes because a lot of installation processes create temporary files with random filenames. For example, the first file 530 ("Package.pkg") could have random names in different installation instances. Without meaningful representations for such unseen nodes, downstream machine learning tasks may not be effectively applied. To address this issue, the node embedder can leverage the context around the first file 530 in generating its vector representation. As a result, even if in some installation instances the filename is different, as long as its context, such as the parts "Downloader.exe write" and "read Setup.exe," remains the same, the node embedder can still generate a vector representation that is close to that of the first file 530 in the embedding space. Such proximity of known nodes in the embedding space can indicate meaningful embeddings for unseen nodes.

As mentioned above with reference to FIG. 4, conceptually, the learned model can tell if some processes in an installation instance may be normal or not. With respect to the SIG 500, the learned model can output a vector representation for the process "Setup.exe" based on all its ancestor nodes and graph structure. If the ancestor nodes or the graph structure diverge greatly from what the model learns from the training data, the output representation of that "Setup.exe" will be of a large distant from the real representation of "Setup.exe" from the node embedder. Such divergence is usually an indicator for malicious installation behaviors.

Referring now to FIG. 7, a block/flow diagram is provided illustrating a system/method 700 for utilizing a model training and validation process used to secure software installations.

At block 710, at least one training software installation graph (SIG) corresponding to at least one software installation is extracted based on training data to obtain a complete set of graphs, the at least one training SIG having nodes representing system subjects and objects and edges recording interactions between the system subjects and objects.

In one embodiment, extracting the at least one training SIG includes iteratively backtracking through all past system events to find relevant system events, constructing at least one preprocessed SIG describing at least a partial software installation instance by converting and mapping each system event into a component of the at least one SIG, and performing postprocessing on the at least one preprocessed SIG to generate the at least one training SIG, including storing the at least one preprocessed SIG in a graph database and merging all relevant graphs that share common nodes stored in the graph database to generate at least one merged graph corresponding to the at least one SIG.

Extracting the at least one training SIG can further include identifying a starting point of the backtracking by finding events of a process writing a binary file or renaming a file into a binary file, and terminating the backtracking based on a set of stop criteria, wherein the postprocessing is performed in response to the termination.

At block 720, the complete set of graphs is divided into a training set and a validation set.

At block 730, node embedding models are learned from the training set using random walks and pathname components, including randomly sampling individual paths to a configurable length from the at least one training SIG to generate training data including the individual paths.

At block 740, a deep graph autoencoder is trained to reconstruct normal process nodes and minimize reconstruction losses between an encoder and a decoder. More specifically, training the deep graph autoencoder can include vectorizing the at least one training SIG based on the node embedding models to generate at least one vectorized SIG, feeding the at least one training SIG into the encoder by topological order of edges to generate an output including a latent vector representation on each process node of the at least one training SIG, and transferring the output to the decoder to reconstruct an original vector representation on each process node.

At block 750, validation data of the validation set is used to verify model performance and determine a threshold of normal software installation using the reconstruction losses. The threshold of normal software installation can be used to perform anomaly detection based on a new SIG corresponding to a new software installation.

Further details regarding blocks 710-750 are described above with reference to FIGS. 1-6.

Referring now to FIG. 8, a block/flow diagram is provided illustrating a system/method 800 for securing software installation through deep graph learning. The system/method 800 can be formed based on training data derived from the model training and validation process utilized by the system/method 700 of FIG. 7.

At block 810, a new software installation graph (SIG) corresponding to a new software installation is extracted based on installation data associated with the new software installation, the new SIG having nodes representing system subjects and objects and edges recording interactions between the system subjects and objects.

In one embodiment, extracting the new SIG includes iteratively backtracking through all past system events to find relevant system events, constructing at least one preprocessed SIG describing at least a partial software installation instance by converting and mapping each system event into a component of the at least one SIG, and performing postprocessing on the at least one preprocessed SIG to generate the at least one training SIG, including storing the at least one preprocessed SIG in a graph database and merging all relevant graphs that share common nodes stored in the graph database to generate at least one merged graph corresponding to the new SIG.

Extracting the new SIG can further include identifying a starting point of the backtracking by finding events of a process writing a binary file or renaming a file into a binary file, and terminating the backtracking based on a set of stop criteria, wherein the postprocessing is performed in response to the termination.

At block 820, at least two node embedding models are used to generate a first vector representation by embedding the nodes of the new SIG and inferring any embeddings for out-of-vocabulary (OOV) words corresponding to unseen pathnames.

At block 830, a deep graph autoencoder including a graph long short-term memory (LSTM) as an encoder and a multilayer perceptron (MLP) as a decoder is implemented to reconstruct nodes of the new SIG from latent vector representations encoded by the graph LSTM, wherein reconstruction losses resulting from a difference of a second vector representation generated by the deep graph autoencoder and the first vector representation represent anomaly scores for each node.

At block 840, anomaly detection is performed by comparing an overall anomaly score of the anomaly scores to a threshold of normal software installation. More specifically, performing the anomaly detection includes determining that the overall anomaly score exceeds the threshold of normal software installation, classifying the new software installation as abnormal in response to determining that the overall anomaly score exceeds the threshold of normal software installation, and generating results of the software installation detection including a list of most suspicious processes of the new software installation sorted by respective anomaly scores. Performing the anomaly detection can further include selecting the node embedding model and the deep graph model from the installation behavior models database based on installed files associated with the new software installation.

Further details regarding blocks 810-840 are described above with reference to FIGS. 1-6.

Figure 9:
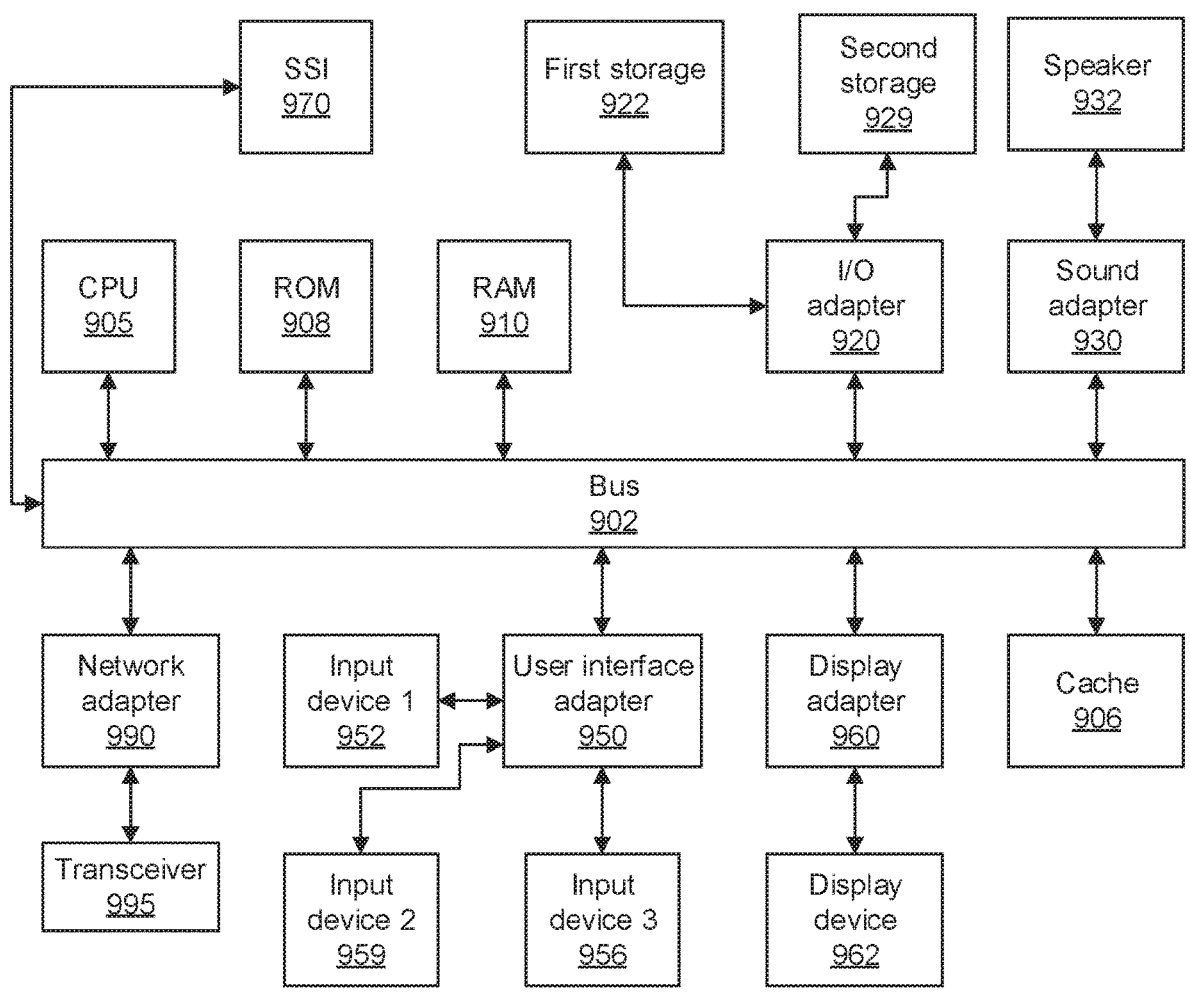
FIG. 9 is a block/flow diagram illustrating a computer system, in accordance with an embodiment the present invention.

Referring now to FIG. 9, an exemplary computer system 900 is shown which may represent a server or a network device, in accordance with an embodiment of the present invention. The computer system 900 includes at least one processor (CPU) 905 operatively coupled to other components via a system bus 902. A cache 906, a Read Only Memory (ROM) 908, a Random-Access Memory (RAM) 910, an input/output (I/O) adapter 920, a sound adapter 930, a network adapter 990, a user interface adapter 950, and a display adapter 960, are operatively coupled to the system bus 902.

A first storage device 922 and a second storage device 929 are operatively coupled to system bus 902 by the I/O adapter 920. The storage devices 922 and 929 can be any of a disk storage device (e.g., a magnetic or optical disk storage device), a solid state magnetic device, and so forth. The storage devices 922 and 929 can be the same type of storage device or different types of storage devices.

A speaker 932 may be operatively coupled to system bus 902 by the sound adapter 930. A transceiver 995 is operatively coupled to system bus 902 by network adapter 990. A display device 962 is operatively coupled to system bus 902 by display adapter 960.

A first user input device 952, a second user input device 959, and a third user input device 956 are operatively coupled to system bus 902 by user interface adapter 950. The user input devices 952, 959, and 956 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 952, 959, and 956 can be the same type of user input device or different types of user input devices. The user input devices 952, 959, and 956 are used to input and output information to and from system 900.

Secure software installation (SSI) component 970 may be operatively coupled to system bus 902. SSI component 970 is configured to perform one or more of the operations described above. SSI component 970 can be implemented as a standalone special purpose hardware device, or may be implemented as software stored on a storage device. In the embodiment in which SSI component 970 is software-implemented, although shown as a separate component of the computer system 900, SSI component 970 can be stored on, e.g., the first storage device 922 and/or the second storage device 929. Alternatively, SSI component 970 can be stored on a separate storage device (not shown).

Of course, the computer system 900 may also include other elements (not shown), as readily contemplated by one of skill in the art, as well as omit certain elements. For example, various other input devices and/or output devices can be included in computer system 900, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 900 are readily contemplated by one of ordinary skill in the art given the teachings of the present invention provided herein.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for securing software installation through deep graph learning, comprising:
   extracting a new software installation graph (SIG) corresponding to a new software installation based on installation data associated with the new software installation, the new SIG having nodes representing system subjects and objects and edges recording interactions between the system subjects and objects, wherein extracting the new SIG further includes running a backtracking process by:
      iteratively backtracking through all past system events to find relevant system events;
      constructing at least one preprocessed SIG describing at least a partial software installation instance by converting and mapping each system event into a component of the at least one SIG; and
      performing postprocessing on the at least one preprocessed SIG to generate the at least one SIG, including storing the at least one preprocessed SIG in a graph database and merging all relevant graphs that share common nodes stored in the graph database to generate at least one merged graph corresponding to the new SIG;
   using at least two node embedding models to generate a first vector representation by embedding the nodes of the new SIG and inferring any embeddings for out-of-vocabulary (OOV) words corresponding to unseen pathnames;
   utilizing a deep graph autoencoder including a graph long short-term memory (LSTM) as an encoder and a multilayer perceptron (MLP) as a decoder to reconstruct nodes of the new SIG from latent vector representations encoded by the graph LSTM, wherein reconstruction losses resulting from a difference of a second vector representation generated by the deep graph autoencoder and the first vector representation represent anomaly scores for each node; and
   performing anomaly detection by comparing an overall anomaly score of the anomaly scores to a threshold of normal software installation.

2. The method as recited in claim 1, further comprising:
   identifying a starting point of the backtracking by finding events of a process writing a binary file or renaming a file into a binary file; and
   terminating the backtracking based on a set of stop criteria, wherein the postprocessing is performed in response to the termination.

3. The method as recited in claim 1, further comprising utilizing a model training and validation process, including:
   extracting at least one training SIG corresponding to at least one software installation based on training data to obtain a complete set of graphs;
   dividing the complete set of graphs into a training set and a validation set;
   learning the node embedding models from the training set using random walks and pathname components, including randomly sampling individual paths to a configurable length from the at least one training SIG to generate training data including the individual paths;
   training the deep graph autoencoder to reconstruct normal process nodes and minimize reconstruction losses between the encoder and the decoder; and
   using validation data of the validation set to verify model performance and determine the threshold of normal software installation using the reconstruction losses.

4. The method as recited in claim 3, wherein training the deep graph autoencoder further includes vectorizing the at least one training SIG based on the node embedding models to generate at least one vectorized SIG.

5. The method as recited in claim 3, wherein training the deep graph autoencoder further includes:
   feeding the at least one training SIG into the encoder by topological order of edges to generate an output including a latent vector representation on each process node of the at least one training SIG; and
   transferring the output to the decoder to reconstruct an original vector representation on each process node.

6. The method as recited in claim 1, wherein performing the anomaly detection further includes:
   determining that the overall anomaly score exceeds the threshold of normal software installation;
   classifying the new software installation as abnormal in response to determining that the overall anomaly score exceeds the threshold of normal software installation; and
   generating results of the software installation detection including a list of most suspicious processes of the new software installation sorted by respective anomaly scores.

7. The method as recited in claim 6, wherein performing the anomaly detection further includes selecting the node embedding model and the deep graph model from the installation behavior models database based on installed files associated with the new software installation.

8. A computer program product comprising a non-transitory computer readable storage medium having program instructions embodied therewith, the program instructions executable by a computer to cause the computer to perform a method for securing software installation through deep graph learning, the method performed by the computer comprising:
   extracting a new software installation graph (SIG) corresponding to a new software installation based on installation data associated with the new software installation, the new SIG having nodes representing system subjects and objects and edges recording interactions between the system subjects and objects, wherein extracting the new SIG further includes running a backtracking process by:
      iteratively backtracking through all past system events to find relevant system events;
      constructing at least one preprocessed SIG describing at least a partial software installation instance by converting and mapping each system event into a component of the at least one SIG; and
      performing postprocessing on the at least one preprocessed SIG to generate the at least one SIG, including storing the at least one preprocessed SIG in a graph database and merging all relevant graphs that share common nodes stored in the graph database to generate at least one merged graph corresponding to the new SIG;

using at least two node embedding models to generate a first vector representation by embedding the nodes of the new SIG and inferring any embeddings for out-of-vocabulary (OOV) words corresponding to unseen pathnames;

utilizing a deep graph autoencoder including a graph long short-term memory (LSTM) as an encoder and a multilayer perceptron (MLP) as a decoder to reconstruct nodes of the new SIG from latent vector representations encoded by the graph LSTM, wherein reconstruction losses resulting from a difference of a second vector representation generated by the deep graph autoencoder and the first vector representation represent anomaly scores for each node; and performing anomaly detection by comparing an overall anomaly score of the anomaly scores to a threshold of normal software installation.

9. The computer program product as recited in claim 8, wherein the method further includes utilizing a model training and validation process, including:

extracting at least one training SIG corresponding to at least one software installation based on training data to obtain a complete set of graphs;

dividing the complete set of graphs into a training set and a validation set;

learning the node embedding models from the training set using random walks and pathname components, including randomly sampling individual paths to a configurable length from the at least one training SIG to generate training data including the individual paths;

training the deep graph autoencoder to reconstruct normal process nodes and minimize reconstruction losses between the encoder and the decoder; and using validation data of the validation set to verify model performance and determine the threshold of normal software installation using the reconstruction losses.

10. The computer program product as recited in claim 9, wherein training the deep graph autoencoder further includes vectorizing the at least one training SIG based on the node embedding models to generate at least one vectorized SIG.

11. The computer program product as recited in claim 9, wherein training the deep graph autoencoder further includes:

feeding the at least one training SIG into the encoder by topological order of edges to generate an output including a latent vector representation on each process node of the at least one training SIG; and transferring the output to the decoder to reconstruct an original vector representation on each process node.

12. The computer program product as recited in claim 8, wherein performing the anomaly detection further includes:

determining that the overall anomaly score exceeds the threshold of normal software installation;

classifying the new software installation as abnormal in response to determining that the overall anomaly score exceeds the threshold of normal software installation; and generating results of the software installation detection including a list of most suspicious processes of the new software installation sorted by respective anomaly scores; and selecting the node embedding model and the deep graph model from the installation behavior models database based on installed files associated with the new software installation.

13. A system for securing software installation through deep graph learning, comprising:

a memory device storing program code; and at least one processor device operatively coupled to the memory device and configured to execute program code stored on the memory device to:

extract a new software installation graph (SIG) corresponding to a new software installation based on installation data associated with the new software installation, the new SIG having nodes representing system subjects and objects and edges recording interactions between the system subjects and objects, wherein the at least one processor device is configured to extract the new SIG further by running a backtracking process by:

iteratively backtracking through all past system events to find relevant system events;

constructing at least one preprocessed SIG describing at least a partial software installation instance by converting and mapping each system event into a component of the at least one SIG; and performing postprocessing on the at least one preprocessed SIG to generate the at least one SIG, including storing the at least one preprocessed SIG in a graph database and merging all relevant graphs that share common nodes stored in the graph database to generate at least one merged graph corresponding to the new SIG;

use at least two node embedding models to generate a first vector representation by embedding the nodes of the new SIG and inferring any embeddings for out-of-vocabulary (OOV) words corresponding to unseen pathnames;

utilize a deep graph autoencoder including a graph long short-term memory (LSTM) as an encoder and a multilayer perceptron (MLP) as a decoder to reconstruct nodes of the new SIG from latent vector representations encoded by the graph LSTM, wherein reconstruction losses resulting from a difference of a second vector representation generated by the deep graph autoencoder and the first vector representation represent anomaly scores for each node; and perform anomaly detection by comparing an overall anomaly score of the anomaly scores to a threshold of normal software installation.

14. The system as recited in claim 13, wherein the at least one processor device is further configured to execute program code stored on the memory device to utilize a model training and validation process by:

extracting at least one training SIG corresponding to at least one software installation based on training data to obtain a complete set of graphs;

dividing the complete set of graphs into a training set and a validation set;

learning the node embedding models from the training set using random walks and pathname components, including randomly sampling individual paths to a configurable length from the at least one training SIG to generate training data including the individual paths;

training the deep graph autoencoder to reconstruct normal process nodes and minimize reconstruction losses between the encoder and the decoder; and using validation data of the validation set to verify model performance and determine the threshold of normal software installation using the reconstruction losses.

15. The system as recited in claim 14, wherein the at least one processor device is further configured to train the deep graph autoencoder by vectorizing the at least one training SIG based on the node embedding models to generate at least one vectorized SIG.

16. The system as recited in claim 14, wherein the at least one processor device is further configured to train the deep graph autoencoder by:

feeding the at least one training SIG into the encoder by topological order of edges to generate an output including a latent vector representation on each process node of the at least one training SIG; and transferring the output to the decoder to reconstruct an original vector representation on each process node.

17. The system as recited in claim 13, wherein the at least one processor device is further configured to perform the anomaly detection by:

determining that the overall anomaly score exceeds the threshold of normal software installation;

classifying the new software installation as abnormal in response to determining that the overall anomaly score exceeds the threshold of normal software installation; and generating results of the software installation detection including a list of most suspicious processes of the new software installation sorted by respective anomaly scores; and selecting the node embedding model and the deep graph model from the installation behavior models database based on installed files associated with the new software installation.

* * * * *